US012759384B2

(12) United States Patent
Shirai et al.

(10) Patent No.: US 12,759,384 B2
(45) Date of Patent: Oct. 13, 2026

(54) VEHICLE BATTERY SUPPORT STRUCTURE

(71) Applicant: TOYOTA JIDOSHA KABUSHIKI KAISHA, Toyota (JP)

(72) Inventors: Yasuhiro Shirai, Toyota (JP); Yuto Nakashima, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 356 days.

(21) Appl. No.: 18/443,484

(22) Filed: Feb. 16, 2024

(65) Prior Publication Data

US 2024/0416736 A1 Dec. 19, 2024

(30) Foreign Application Priority Data

Jun. 16, 2023 (JP) ................................ 2023-099203

(51) Int. Cl.

| | |
|---|---|
| ***B60K 1/04*** | (2019.01) |
| ***B62D 21/03*** | (2006.01) |
| ***B62D 25/02*** | (2006.01) |
| ***H01M 50/242*** | (2021.01) |
| ***H01M 50/249*** | (2021.01) |
| *B62D 21/15* | (2006.01) |

(52) U.S. Cl.

CPC ................ *B60K 1/04* (2013.01); *B62D 21/03* (2013.01); *B62D 25/025* (2013.01); *H01M 50/242* (2021.01); *H01M 50/249* (2021.01); *B60K 2001/0438* (2013.01); *B62D 21/157* (2013.01); *H01M 2220/20* (2013.01)

(58) Field of Classification Search

CPC ... B60K 1/04; B60K 2001/0438; B60L 50/66; H01M 50/242; H01M 50/249; B62D 21/03

See application file for complete search history.

(56) References Cited

U.S. PATENT DOCUMENTS

| | | | | |
|---|---|---|---|---|
| 10,493,837 B1 * | 12/2019 | Angelo | .................... | B60K 6/28 |
| 10,967,722 B2 * | 4/2021 | Tanaka | .................... | B60L 50/64 |
| 11,021,070 B2 * | 6/2021 | Miyoshi | .............. | H01M 50/249 |
| 11,043,714 B2 * | 6/2021 | Sloan | ....................... | B60K 1/04 |
| 11,325,453 B2 * | 5/2022 | Friedman | ............ | H01M 50/249 |

(Continued)

FOREIGN PATENT DOCUMENTS

| | | | | |
|---|---|---|---|---|
| JP | 2022050141 A * | 3/2022 | | |
| JP | 2023-006069 A | 1/2023 | | |
| WO | WO-2021106391 A1 * | 6/2021 | ............ | B62D 21/02 |

OTHER PUBLICATIONS

Translation of WO-2021106391-A1 (Year: 2021).*

*Primary Examiner* — Katy M Ebner

(74) *Attorney, Agent, or Firm* — SoraIP, Inc.

(57) ABSTRACT

In the vehicle battery support structure, the battery pack is disposed below the ladder frame. The battery bracket is fixed to a vehicle width direction outer side of the battery pack. The suspension bracket is secured to the battery bracket. The suspension bracket includes a horizontal portion and an inclined portion. The horizontal portion extends in the vehicle width direction from an outer side in the vehicle width direction of the side rail. The inclined portion extends outward and downward in the vehicle width direction from an outer end of the horizontal portion in the vehicle width direction. The shock absorbing component is disposed on the vehicle width direction outer side of the battery bracket.

12 Claims, 8 Drawing Sheets

(56) References Cited

U.S. PATENT DOCUMENTS

| | | | | |
|---|---|---|---|---|
| 11,465,482 | B2 * | 10/2022 | Menon | H01M 50/204 |
| 12,220,979 | B2 * | 2/2025 | Okonogi | H01M 50/204 |
| 12,319,212 | B2 * | 6/2025 | Harasawa | H01M 50/264 |
| 12,403,757 | B2 * | 9/2025 | Kumagai | B62D 21/02 |
| 2018/0062125 | A1 * | 3/2018 | Kaneshige | B60K 1/04 |
| 2018/0272852 | A1 * | 9/2018 | Ajisaka | B62D 21/07 |
| 2021/0039716 | A1 * | 2/2021 | Sasaoka | B62D 27/065 |
| 2021/0146765 | A1 * | 5/2021 | Menon | B60K 1/04 |
| 2021/0245596 | A1 * | 8/2021 | Arana | H01M 50/242 |
| 2022/0126664 | A1 * | 4/2022 | Caliskan | B60K 1/04 |
| 2022/0134857 | A1 * | 5/2022 | Baccouche | B62D 25/2036 180/68.5 |
| 2022/0250458 | A1 * | 8/2022 | Kimura | B60K 1/04 |
| 2022/0320661 | A1 * | 10/2022 | Yoshida | H01M 50/249 |
| 2022/0388385 | A1 * | 12/2022 | Okonogi | H01M 50/249 |
| 2023/0264562 | A1 * | 8/2023 | Kamemoto | B60K 1/04 180/65.1 |
| 2024/0034138 | A1 * | 2/2024 | Bell | H01M 50/249 |
| 2024/0123807 | A1 * | 4/2024 | Hausler | B62D 21/02 |
| 2024/0286480 | A1 * | 8/2024 | Kumagai | B62D 21/09 |
| 2024/0375722 | A1 * | 11/2024 | Osaka | B62D 25/025 |
| 2025/0083752 | A1 * | 3/2025 | Fujino | B62D 21/02 |
| 2025/0316821 | A1 * | 10/2025 | Landvik | H01M 50/258 |
| 2026/0091823 | A1 * | 4/2026 | Kakishima | B62D 21/157 |

* cited by examiner

VEHICLE BATTERY SUPPORT STRUCTURE

CROSS-REFERENCE TO RELATED APPLICATION

This application claims priority to Japanese Patent Application No. 2023-099203 filed on Jun. 16, 2023, incorporated herein by reference in its entirety.

BACKGROUND

1. Technical Field

A vehicle battery support structure is disclosed herein.

2. Description of Related Art

In US 2022/0134857, a battery is disposed between a pair of rockers in a vehicle of a monocoque structure. In US 2022/0126664 and US 2021/0245596, a battery is disposed between a pair of side rails in a vehicle of a ladder frame structure.

SUMMARY

In order to increase the battery mounting space, it is conceivable to dispose the battery under the side rails in the vehicle of the ladder frame structure. According to such a layout, the battery can be disposed to the outer side in the vehicle width direction with respect to the side rails. On the other hand, it is necessary to protect the battery in the event of a side collision of the vehicle.

Accordingly, a vehicle battery support structure is disclosed herein. According to this support structure, damage to a battery disposed under a side rail can be suppressed in the event of a side collision.

A vehicle battery support structure is disclosed herein.

The vehicle battery support structure includes a ladder frame, a battery pack, a battery bracket, a suspension bracket, and a shock absorbing component.

The ladder frame includes a side rail extending in a vehicle front-rear direction.

The battery pack is disposed below the ladder frame.

The battery bracket is fixed to an outer side of the battery pack in a vehicle width direction.

The suspension bracket is fixed to the battery bracket. The suspension bracket includes a horizontal portion and an inclined portion. The horizontal portion extends in the vehicle width direction from an outer side of the side rail in the vehicle width direction. The inclined portion extends outward in the vehicle width direction and downward from an outer end of the horizontal portion in the vehicle width direction.

The shock absorbing component is disposed on an outer side of the battery bracket in the vehicle width direction.

According to the above configuration, the shock absorbing component receives a collision load in the event of a side collision of the vehicle. Further, the collision load is transmitted to the ladder frame via the battery bracket and the suspension bracket. By providing a load transmission path that detours around the battery pack, it is possible to suppress damage to the battery pack in the event of a side collision.

In the above configuration, the suspension bracket may be provided with a bent portion. The bent portion may be provided between the horizontal portion and the inclined portion. The bent portion may be provided at a height equal to or higher than an upper surface of the battery pack.

As the side collision progresses, the suspension bracket is bent and deformed at the bent portion. When the bent portion is disposed at a height equal to or higher than the upper surface of the battery pack, the suspension bracket is bent and deformed so as to detour around the battery pack.

In the above configuration, at least a part of the shock absorbing component and at least a part of the battery pack may be disposed at the same height.

In this case, the shock absorbing component may be supported on the side rail via the battery bracket and the suspension bracket.

According to the above configuration, the transmission of a collision load to the battery pack arranged side by side with the shock absorbing component in the vehicle width direction is suppressed.

In the above configuration, the side rail may be provided with a cab mount bracket. The cab mount bracket may support a cabin.

The suspension bracket may be fixed to the cab mount bracket.

According to the above configuration, a collision load is distributed to skeletal components of the cabin.

In the above configuration, a rocker extending in the vehicle front-rear direction may be disposed below the cabin and on an outer side of the cabin in the vehicle width direction.

In this case, the inclined portion of the suspension bracket may be disposed below the rocker.

In the event of a side collision of the vehicle, the suspension bracket is bent and deformed at the bent portion. Accordingly, the inclined portion is lifted upward. Since the rocker is disposed above the inclined portion, excessive ascent of the inclined portion is suppressed.

According to the vehicle battery support structure disclosed herein, damage to a battery disposed under a side rail can be suppressed in the case of a side collision.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a vehicle battery support structure according to the present embodiment will be described with reference to the drawings. The shapes, materials, numbers, and numerical values described below are illustrative examples, and can be appropriately changed according to the specifications of the vehicle battery support structure. In the following, like elements are given the same reference signs in all drawings.

In addition, in FIGS. 1 to 8, a Cartesian coordinate system including a FR axis, a RW axis, and a UP axis is used to represent positions and orientations of respective components. The FR axis is a vehicle front-rear direction axis with the forward direction of the vehicle as the positive direction. RW is a vehicle-width-direction shaft having a vehicle-right side as a positive direction. The UP axis is a vehicle up-down direction with the upper side as the positive direction.

Overall Configuration

Figure 1:
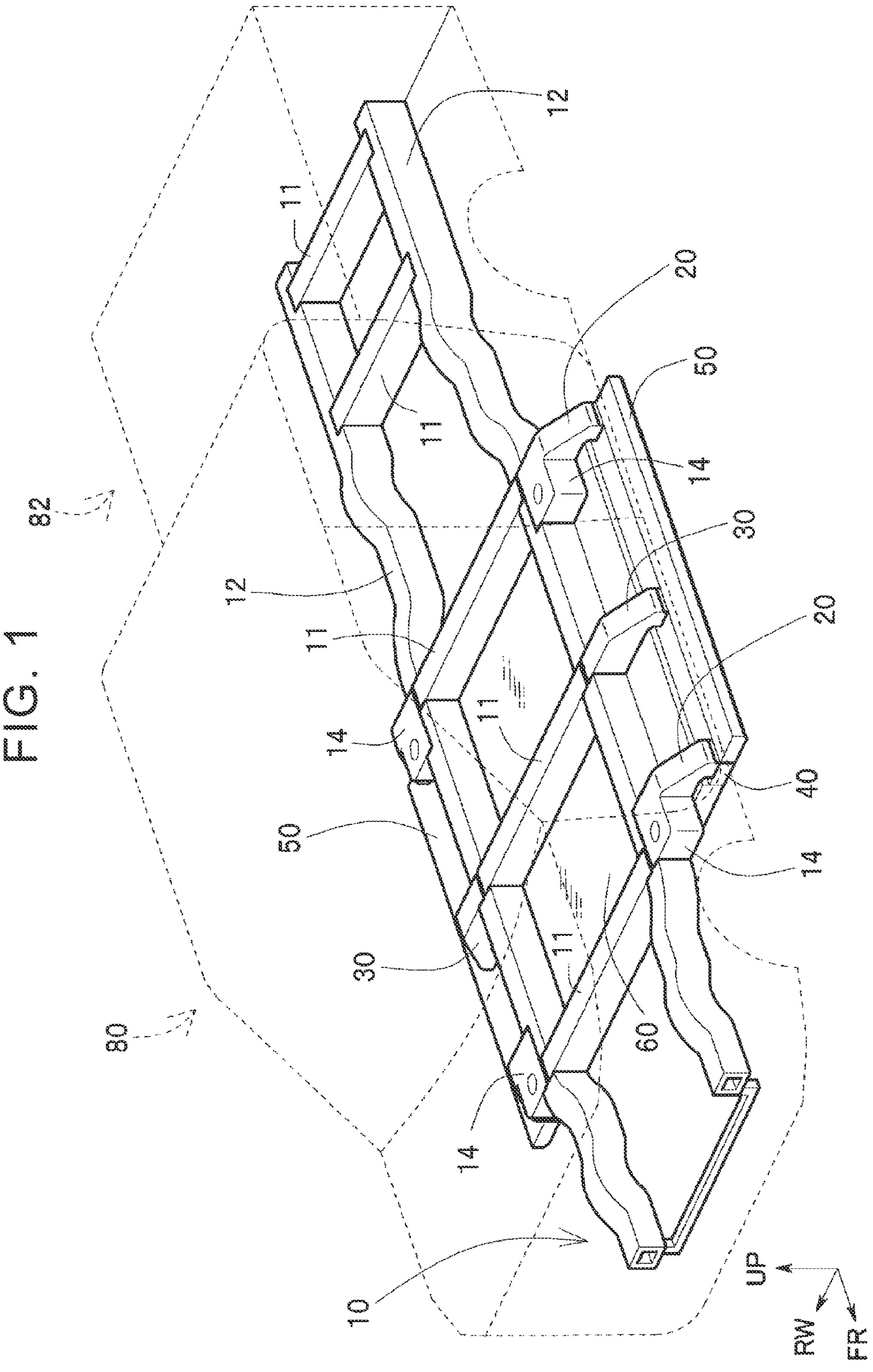
FIG. 1 is an overall perspective view illustrating a vehicle battery support structure according to the present embodiment.

FIG. 1 illustrates a vehicle battery support structure according to the present embodiment. The vehicle illustrated in FIG. 1 includes a ladder frame 10 as a skeleton component. A body is mounted on the ladder frame 10. For example, the vehicle is a pickup truck. That is, the body includes a cabin 80 and a rear deck 82.

As also illustrated in FIG. 1, the vehicle includes a large battery pack 60. For example, the vehicle is an electric pickup truck. That is, the vehicle includes a rotary electric machine (not shown) as a drive source. A battery pack 60 is mounted on a vehicle as a power source of the rotary electric machine.

As will be described later, the vehicle battery support structure according to the present embodiment includes the ladder frame 10, the battery pack 60, the battery bracket 40, the suspension brackets 20 and 30, and the shock absorbing component 50.

Ladder Frame and Surrounding Structure

Referring to FIG. 1, the ladder frame 10 includes a plurality of cross members 11 and a pair of side rails 12 and 12. The pair of side rails 12 and 12 extend in the vehicle front-rear direction. The pair of side rails 12 and 12 are arranged at intervals in the vehicle width direction.

Figure 2:
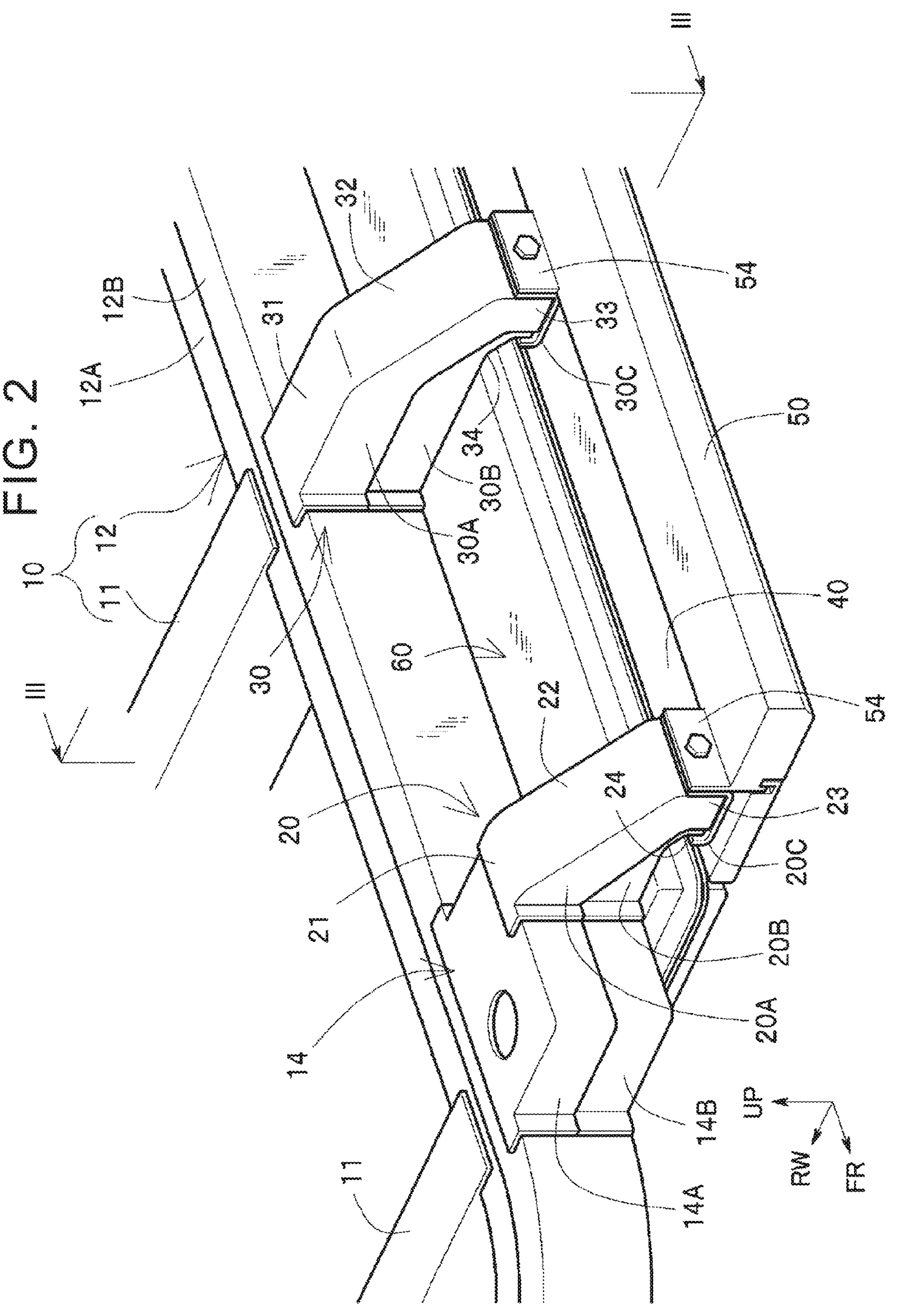
FIG. 2 is an enlarged perspective view illustrating the structure around the suspension bracket.
Figure 3:
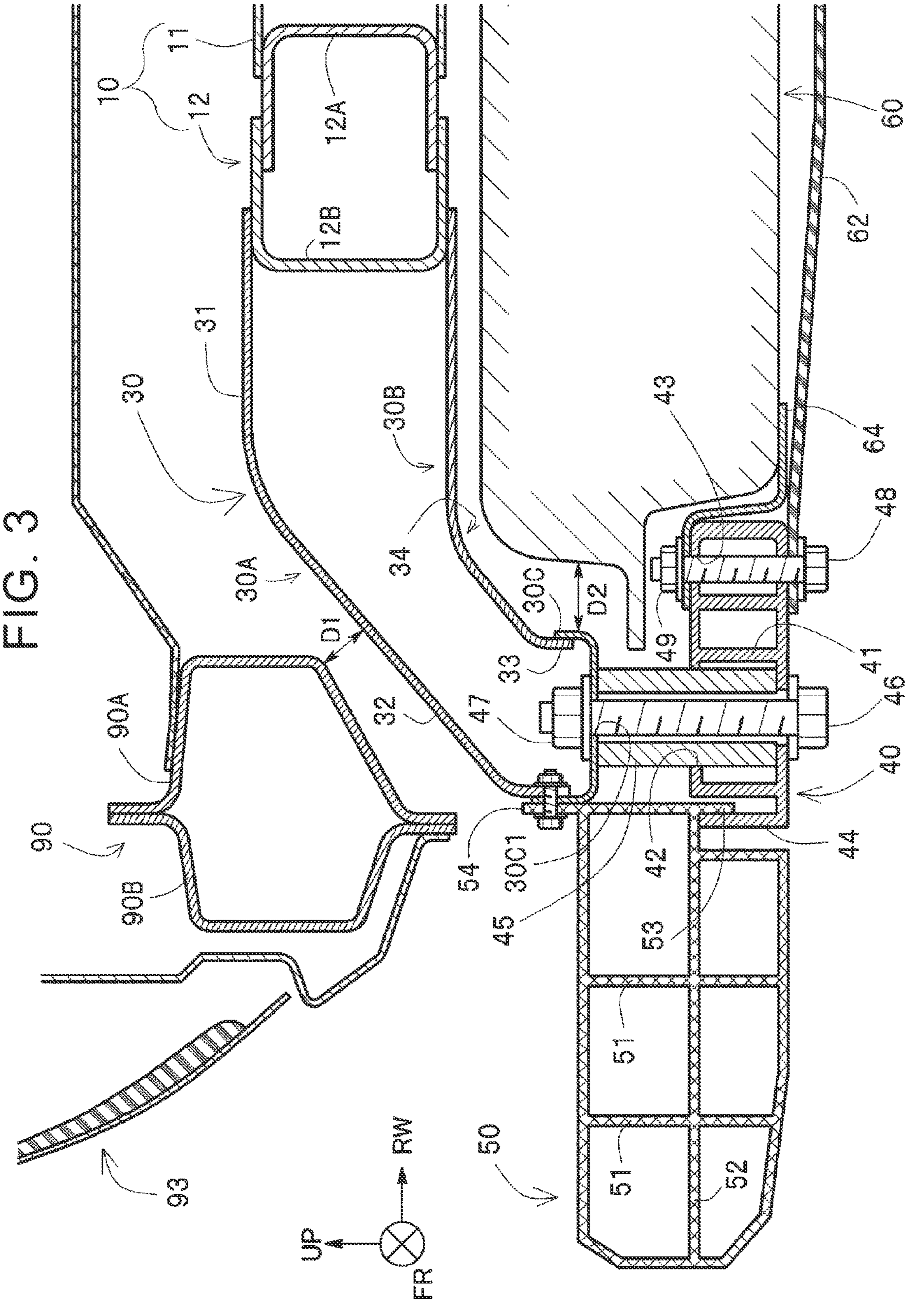
FIG. 3 is a cross-sectional view taken along line III-III of FIG. 2.

Referring to FIGS. 2 and 3, each side rail 12 has, for example, a closed cross-sectional structure having a rectangular cross-section. For example, the side rail 12 includes a side rail inner 12A and a side rail outer 12B. Each of the side rail inner 12A and the side rail outer 12B has a U-shaped cross section. The side rail inner 12A and the side rail outer 12B are superposed to form a closed cross-sectional configuration.

Referring to FIGS. 1 and 2, the cross member 11 is a skeletal component extending in the vehicle width direction. Both ends of each cross member 11 in the vehicle width direction are fixed to a pair of side rails 12 and 12.

Referring to FIGS. 1 and 2, a cab mount bracket 14 and suspension brackets 20 and 30 are fixed to the side rails 12. The cab mount bracket 14 and the suspension brackets 20 and 30 are disposed on the vehicle width direction outer side of the side rail 12.

The cab mount bracket 14 supports the cabin 80 from the bottom surface. The cab mount brackets 14 are welded to the side rail outer 12B, for example. Cab-mounted brackets 14 are hollow structures for example.

The cab mount bracket 14 includes a cab mount bracket upper 14A and a cab mount bracket lower 14B. The cab mount bracket upper 14A and the cab mount bracket lower 14B are, for example, L-shaped in cross section. The cab mount bracket upper 14A and the cab mount bracket lower 14B are superposed to form a hollow-structure cab mount bracket 14.

The suspension brackets 20 and 30 hang and support the battery pack 60. For example, the suspension bracket 30 is provided on an extension line of the cross member 11. For example, the suspension bracket 30 is welded to the side rail outer 12B. The suspension bracket 20 is welded to the cab mount bracket 14.

As will be described later, in the case of a side collision of the vehicle, a collision load is transmitted from the suspension bracket 30 to the side rail 12. In addition, a collision load is transmitted from the suspension bracket 20 to the cab mount bracket 14. Furthermore, an impact load is transmitted from the cab mount bracket 14 to the rocker 90 (see FIG. 3) of the cabin 80. In this way, the impact load is distributed from the suspension brackets 20 and 30 to the skeletal components of the vehicle. The detailed structure of the suspension brackets 20 and 30 will be described later.

Battery Pack

Referring to FIGS. 2 and 3, a battery pack 60 is disposed below the ladder frame 10. As described above, the vehicle includes a rotary electric machine as a drive source. The battery pack 60 is a power source of a rotary electric machine.

The battery pack 60 includes a plurality of unit cells and a casing. The single cell is, for example, a lithium ion battery or a nickel hydrogen battery. The plurality of cells is housed in a casing.

Referring to FIG. 1, the battery pack 60 is disposed, for example, below the cabin 80. The planar area of the battery pack 60 is, for example, substantially equal to the floor area of the cabin 80. For example, the front-rear dimension of the battery pack 60 is substantially equal to the front-rear dimension of the cabin 80. The vehicle width dimension of the battery pack 60 is substantially equal to the vehicle width dimension of the cabin 80.

As described further below, the shock absorbing component 50 is fixed to the battery pack 60. The shock absorbing component 50 is disposed at both ends in the vehicle width direction of the battery pack 60. Since the vehicle width dimension of the battery pack 60 is substantially equal to the vehicle width dimension of the cabin 80, at least a portion of the shock absorbing component 50 protrudes outward in the vehicle width direction from the cabin 80. As will be described later, the shock absorbing component 50 also functions as a step used when getting on and off the cabin 80.

Battery Support Structure

Referring to FIGS. 2 and 3, the battery pack 60 is supported by the side rails 12 via the suspension brackets 20 and 30, the battery bracket 40, and the mounting bracket 64. The battery bracket 40 is disposed below the suspension brackets 20 and 30. More particularly, the suspension brackets 20, 30 comprise a lower plate 20C, 30C as a component. Battery brackets 40 are disposed below the lower plate 20C, 30C.

Referring to FIG. 1, for example, the battery bracket 40 has substantially the same front and rear dimensions as the battery pack 60. The battery bracket 40 is fixed to the vehicle width direction outer side of the battery pack 60. Although the support structure on the left side of the vehicle is shown in FIGS. 1 to 8, the right side of the vehicle has the same structure as in FIGS. 1 to 8 based on the symmetrical structure of the vehicle.

Referring to FIG. 3, the battery brackets 40 have a vertical grid-shaped UP-RW cross section. That is, a plurality of inner plates 41 are disposed inside the battery bracket 40. The inner plate 41 extends in the vertical direction. Further, the plurality of inner plates 41 are arranged at intervals along the vehicle width direction. The battery bracket 40 having the hollow structure as described above is crushed in the vehicle width direction in the case of a side collision of the vehicle. This collapse absorbs the impact load.

Bolt holes 42 and 43 are bored in the battery bracket 40 in the up-down direction. A bolt hole 42 is provided to secure the battery bracket 40 to the suspension bracket 30. The bolt hole 43 is provided to fix the battery pack 60 to the battery bracket 40.

A bolt 46 is inserted into the bolt hole 42. Bolt hole 30C1 is drilled in the lower plate 30C of the suspension bracket 30. A weld nut 47 is arranged coaxially with the bolt hole 30C1 in the lower plate 30C. The bolt 46 is screwed into the weld nut 47. Further, a collar 45 is disposed between the battery bracket 40 and the lower plate 30C. The collar 45 defines the separation between the battery bracket 40 and the lower plate 30C.

A bolt 48 is inserted into the bolt hole 43. A mounting bracket 64 is disposed on the vehicle width direction outer side of the battery pack 60. The mounting bracket 64 is a component having a Z-shaped cross section. The vehicle width direction end portion of the battery pack 60 is placed on the lower plate of the mounting bracket 64. In addition, a weld nut 49 is disposed on the upper plate of the mounting bracket 64. The battery pack 60 is supported by the battery bracket 40 by screwing the bolt 48 into the weld nut 49.

The battery cover 62 of the mud guard is disposed below the battery pack 60. The battery cover 62 is supported by the battery bracket 40 by the bolt 48.

A hook 44 is provided at an outer end portion of the battery bracket 40 in the vehicle width direction. The hook 44 is arranged upwardly. Further, the shock absorbing component 50 is provided with a hook 53. The hook 53 is arranged downward. The hooks 44 and 53 are engaged.

When the shock absorbing component 50 is utilized as a step, the shock absorbing component 50 deflects downward due to the weight of the occupant. In response to this deflection, the hook 44 of the battery bracket 40 also deflects. For example, the hook 44 is deflected to open. Here, in the battery bracket 40, the hook 44 is bent exclusively, and the other body portion is prevented from being bent. By suppressing the deflection of the main body portion, rubbing of the main body portion with peripheral components such as the collar 45 is suppressed.

The shock absorbing component 50 is disposed outside the battery bracket 40 in the vehicle width direction. For example, the shock absorbing component 50 is formed to have a height dimension larger than that of the battery bracket 40. Further, the respective components are positioned such that the bottom surfaces of the shock absorbing component 50, the battery bracket 40, and the battery pack 60 are substantially at the same height.

For example, the shock absorbing component 50 is a hollow structure. For example, the shock absorbing component has a cross-shaped cross-section in UP-RW. Inner plates 51 and 52 are provided inside the shock absorbing component 50. The inner plate 51 extends in the vertical direction. The inner plate 52 extends in the horizontal direction.

The shock absorbing component 50 is crushed in the vehicle width direction at the time of a side collision of the vehicle. This collapse absorbs the impact load. The shock absorbing component 50 is also used as a step. The inner plate 51 may be formed to be thicker than the inner plate 52 in order to ensure the load-bearing property in the vertical direction and to achieve case of collapse at the time of a side-surface collision.

A flange 54 and a hook 53 are provided at an inner end portion of the shock absorbing component 50 in the vehicle width direction. The hook 53 mates with the hook 44 of the battery bracket 40 as described above. The flange 54 abuts the vertical portion 33 of the suspension bracket 30. Further, the flange 54 is bolted to the vertical portion 33.

Referring to FIGS. 2 and 3, the suspension bracket 30 is fixed to the side rail 12. For example, the suspension bracket 30 is welded to the side rail outer 12B. The suspension bracket 20 is fixed to the side rail 12 via the cab mount bracket 14. For example, the suspension bracket 20 is fixed to the cab mount bracket 14.

Referring now to FIG. 2, the suspension bracket 20 has a structure similar to that of the suspension bracket 30. More specifically, the suspension bracket 20 is shorter than the suspension bracket 30 by the vehicle width dimension of the cab mount bracket 14. Specifically, the horizontal portion 21 of the suspension bracket 20 is shorter than the horizontal portion 31 of the suspension bracket 30. However, for other structures, the suspension bracket 20 has a structure similar to that of the suspension bracket 30. In order to avoid duplication of the description, the structure of the suspension bracket 30 will be described exclusively below. However, by replacing the 10 digit number of the reference number from 3 to 2, the following description is replaced with the structural description of the suspension bracket 20.

The suspension bracket 30 comprises a hollow structure. For example, the suspension bracket 30 is composed of a plurality of parts. That is, the suspension bracket 30 includes a suspension bracket upper 30A, a suspension bracket lower 30B, and a lower plate 30C. These components are joined together by welding.

The suspension bracket 30 includes a horizontal portion 31, an inclined portion 32, and a vertical portion 33. The horizontal portion 31 extends from the side rail outer 12B to the vehicle-width-direction outer side. An inclined portion 32 is connected to an outer end of the horizontal portion 31 in the vehicle width direction. The inclined portion 32 extends outward and downward in the vehicle width direction. A vertical portion 33 is connected to a lower end of the inclined portion 32. Further, a lower plate 30C is connected to the lower end of the vertical portion 33. The lower plate 30C has, for example, a U-shaped cross section and is fixed to the suspension bracket upper 30A and the suspension bracket lower 30B so as to cover the vertical portion 33.

Figure 5:
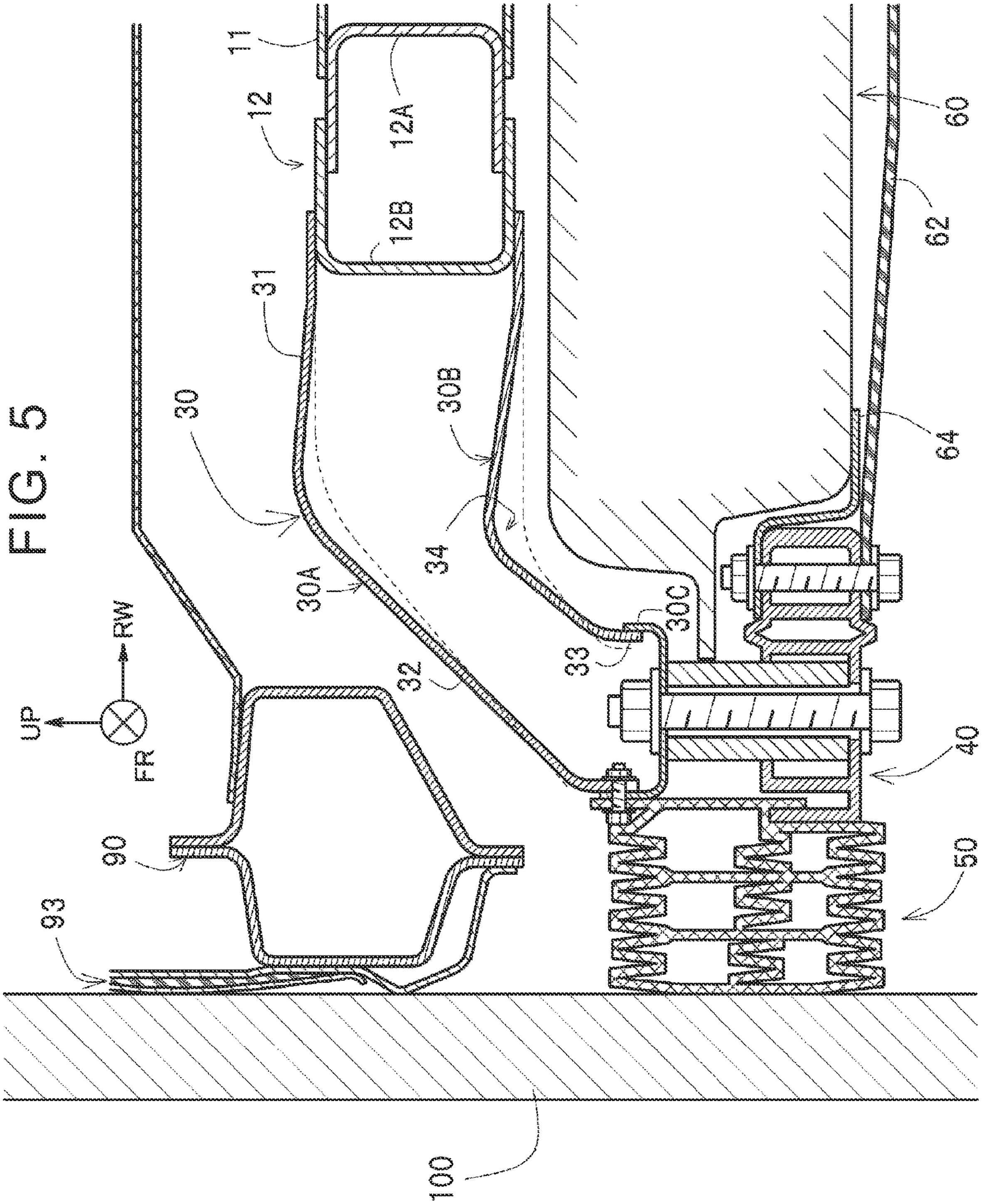
FIG. 5 is a cross-sectional view illustrating an example when a side collision is advanced.

A bent portion 34 is formed between the horizontal portion 31 and the inclined portion 32. The bent portion 34 is disposed at a height equal to or higher than the upper surface of the battery pack 60. As shown in FIG. 5, which will be described later, when the vehicle collides with the side surface, the suspension bracket 30 is bent and deformed upward starting from the bent portion 34. When the bent portion 34 is provided at a height equal to or higher than the upper surface of the battery pack 60, interference between the suspension bracket 30 and the battery pack 60 during deformation is suppressed.

Referring to FIG. 3, the inclined portion 32 is disposed below the rocker 90. The rocker 90 is a skeletal component disposed below the cabin 80 (see FIG. 1) and outside in the vehicle width direction. The rocker 90 extends in the vehicle front-rear direction.

The rocker 90 includes a rocker inner 90A and a rocker outer 90B. Both the rocker inner 90A and the rocker outer 90B have a cross-sectional hat shape, and the two are overlapped to form a closed cross-sectional structure.

As will be described later, at the time of side collision of the vehicle, the inclined portion 32 moves upward (ascends). Since the rocker 90 is disposed above the inclined portion 32, the upward movement of the inclined portion 32 is stopped by the rocker 90. Excessive ascending of the inclined portion 32 is suppressed, thereby suppressing the deflection of the battery pack 60 supported by the suspension bracket 30.

Behavior at Side Collision

Figure 4:
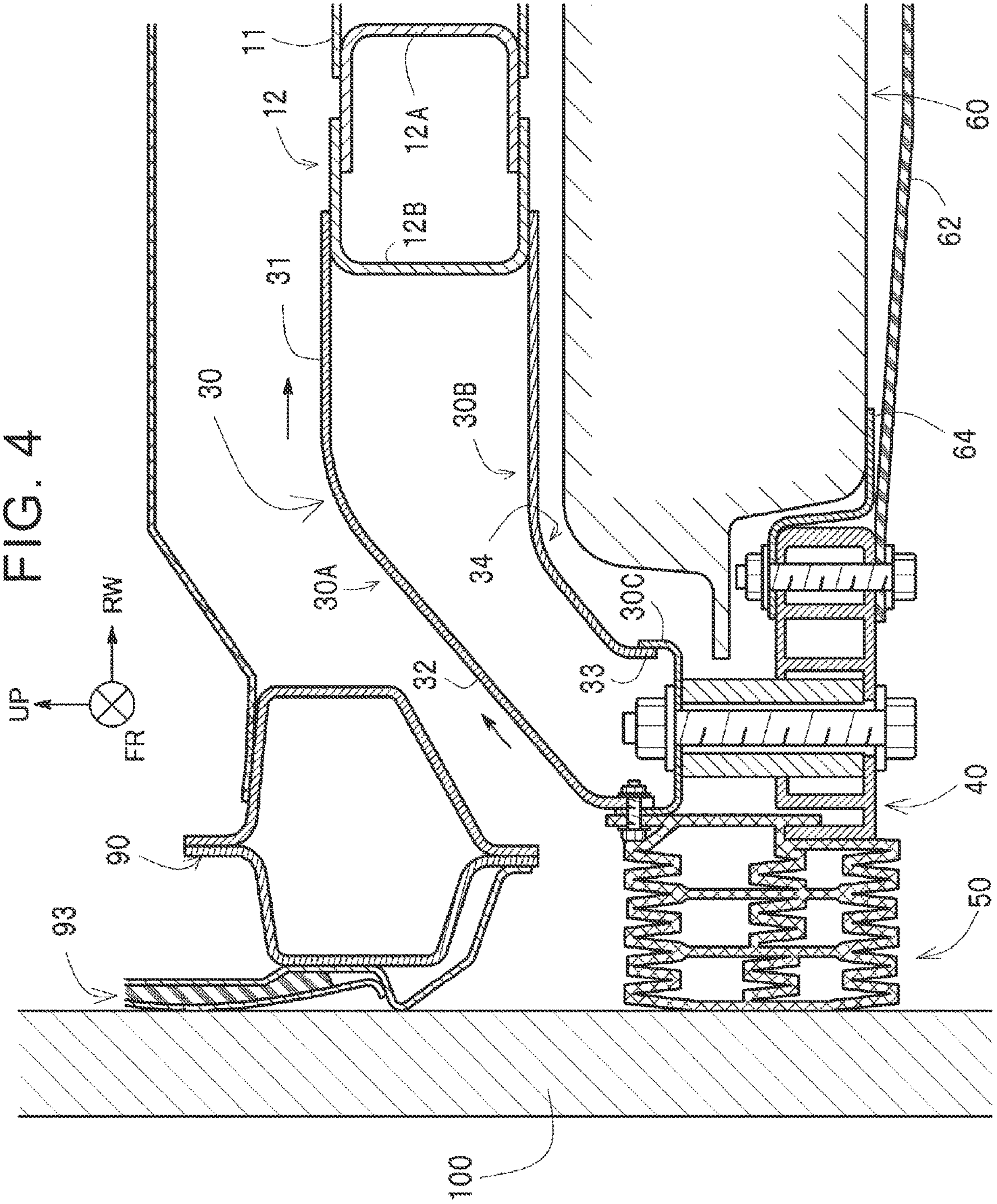
FIG. 4 is a cross-sectional view illustrating an initial state of side collision.

FIG. 4 and FIG. 5 exemplify the behavior of the vehicle at the time of side collision. For example, the vehicle may slip sideways and strike the barrier 100. The door 93 and the shock absorbing component 50 provided on the outside in the vehicle width direction of the vehicle are crushed and deformed. As a result, the impact load is absorbed.

The shock absorbing component 50 is supported by the side rail 12 via the battery bracket 40 and the suspension brackets 20 and 30. Accordingly, the impact load is transmitted from the shock absorbing component 50 to the side rail 12. Referring to FIG. 4, at least a portion of the shock absorbing component 50 and at least a portion of the battery pack 60 are disposed at the same height. However, the impact load is released from the shock absorbing component 50 to the upper part of the battery pack 60 via the suspension bracket 30. That is, the transmission of the collision load to the battery pack 60 is suppressed.

Referring also to FIGS. 2 and 4, the impact load received by the suspension bracket 20 is transmitted from the cab mount bracket 14 to the rocker 90. That is, in the ladder frame structure, the collision load is distributed to the skeletal component of the cabin 80.

Still referring to FIG. 5, as the side collision progresses, the battery bracket 40 collapses and deforms. Accordingly, the suspension bracket 30 is bent and deformed starting from the bent portion 34. Referring also to FIG. 2, the suspension bracket 20 also bends and deforms with the bent portion 24 as a starting point. This bending deformation is also referred to as top-folding deformation.

The bent portion 34 is disposed at a height equal to or higher than the upper surface of the battery pack 60. Therefore, interference between the suspension brackets 20 and 30 and the battery pack 60 during the upper-fold deformation is suppressed.

Here, when the upper folding is excessively advanced, the vertical portions 23 and 33 of the suspension brackets 20 and 30 approach the battery pack 60. However, as the upward folding progresses, the inclined portion 32 approaches the rocker 90. By adopting a configuration in which the inclined portion 32 interferes with the rocker 90 before the vertical portions 23 and 33 interfere with the battery pack 60, interference between the suspension brackets 20 and 30 and the battery pack 60 is suppressed.

For example, referring to FIG. 3, the shortest distance D1 between the inclined portion 32 and the rocker 90 is shorter than the shortest distance D2 between the vertical portion 33 and the battery pack 60. This arrangement suppresses interference between the suspension brackets 20 and 30 and the battery pack 60.

Another Example of a Battery Support Structure

Figure 6:
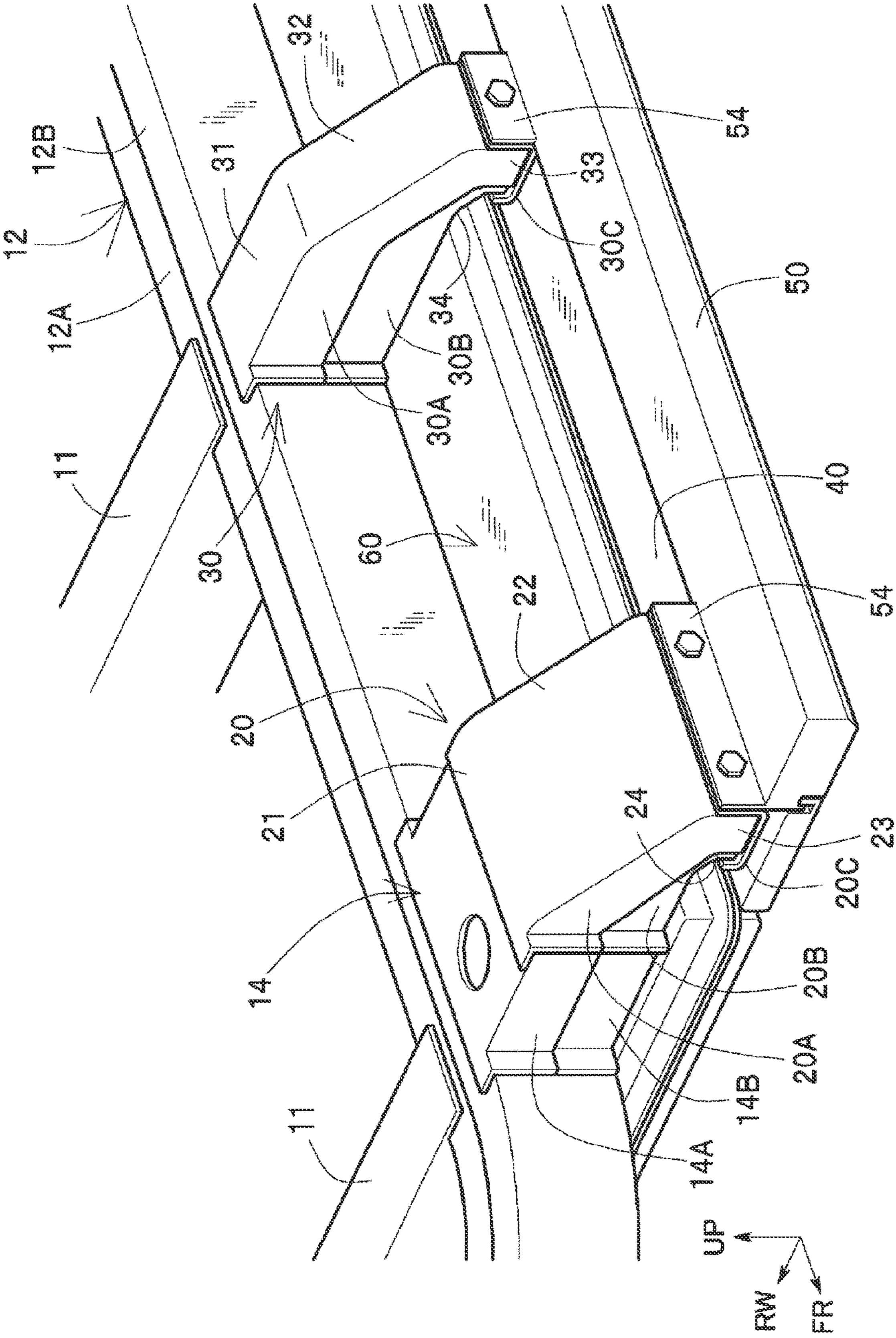
FIG. 6 is an enlarged perspective view illustrating a first alternative example of a suspension bracket.

Another example of a battery support structure is shown in FIG. 6. In this example, the length of the suspension bracket 20 in the vehicle front-rear direction is equal to the length of the cab mount bracket 14 in the vehicle front-rear direction. In this example, since the fastening point between the battery pack 60 and the suspension bracket 20 increases, the battery pack 60 is supported more firmly. Further, in the case of a side collision, the load is more smoothly transmitted from the suspension bracket 20 to the cab mount bracket 14.

Figure 7:
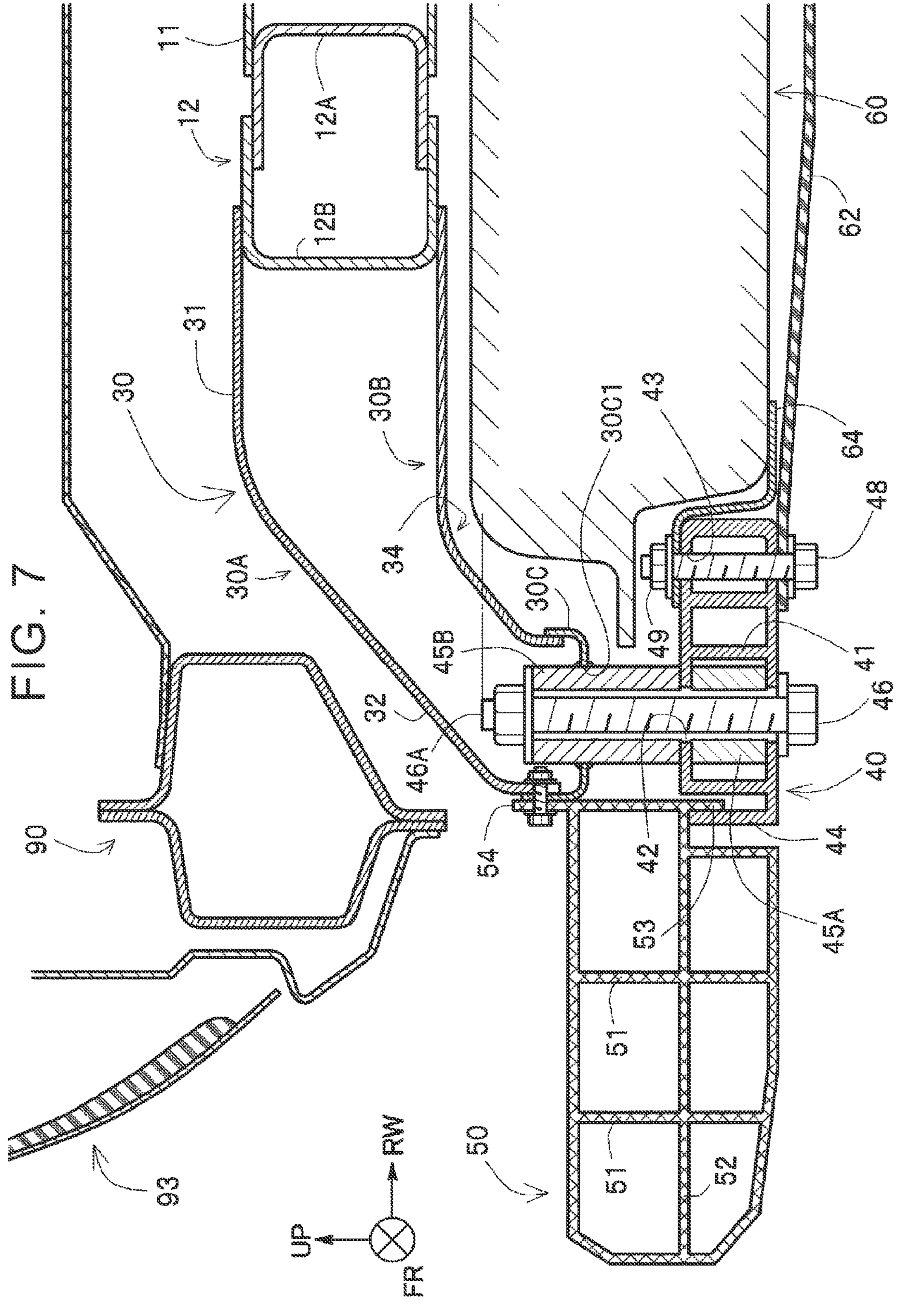
FIG. 7 is a cross-sectional view of a second alternative suspension bracket.
Figure 8:
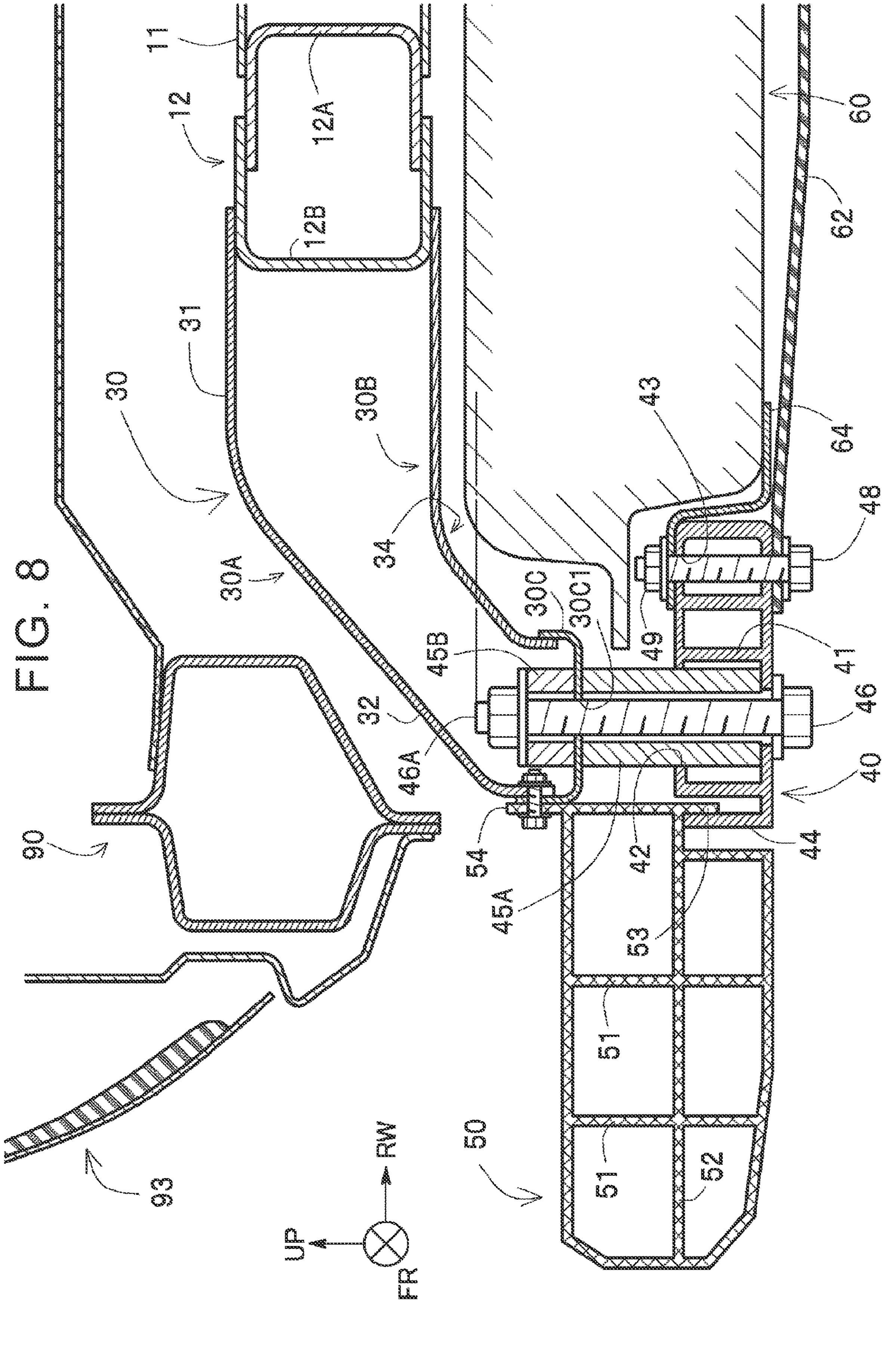
FIG. 8 is a cross-sectional view illustrating a third alternative example of the suspension bracket.

FIG. 7 and FIG. 8 show modified examples (second alternative example and third alternative example) of the suspension bracket 30. In these examples, a structure that suppresses bending deformation below the bent portion 34 is provided. For example, in FIGS. 7 and 8, the axial length of the bolt 46 is longer than the bolt 46 in FIG. 3. Here, the shaft end 46A of the bolt 46 is positioned lower than the bent portion 34.

Referring to FIG. 7, two collar 45A, 45B into which the bolt 46 is inserted are provided in the support arrangement of the battery. The collar 45A is disposed within the battery brackets 40. The collar 45B enters from the upper surface of the battery bracket 40 to the inside of the suspension bracket 30. For example, the collar 45B and the lower plate 30C are welded.

In the embodiment of FIG. 8, a collar 45A is arranged from the battery bracket 40 to the lower plate 30C. Furthermore, a collar 45B is arranged inside the suspension bracket 30.

Thus, in FIGS. 7 and 8, the bolt 46 and the collar 45B enter the interior of the suspension bracket 30. The upper ends of the bolt 46 and the collar 45B are positioned below the bent portion 34. With such a configuration, the lower portion of the bent portion 34 is reinforced. For example, the vertical portion 33 is less likely to be crushed. Due to such reinforcement, bending deformation starting from the bent portion 34 is likely to occur.

What is claimed is:

1. A vehicle battery support structure comprising:
   - a ladder frame including a side rail extending in a vehicle front-rear direction;
   - a battery pack disposed below the ladder frame;
   - a battery bracket fixed to an outer side of the battery pack in a vehicle width direction, the battery bracket extending in the vehicle front-rear direction;
   - a suspension bracket fixed to the battery bracket, the suspension bracket having a hollow structure formed of a plurality of walls, one wall of the plurality of walls including
     - a horizontal portion extending in the vehicle width direction from an outer side of the side rail in the vehicle width direction,
     - an inclined portion extending both outward and downward from an outer end of the horizontal portion in the vehicle width direction, and
     - a vertical portion connected to a lower end of the inclined portion; and
   - a shock absorbing component disposed on an outer side of the battery bracket in the vehicle width direction, the shock absorbing component being directly coupled to the vertical portion.

2. The vehicle battery support structure according to claim 1, wherein:

the suspension bracket is provided with a bent portion between the horizontal portion and the inclined portion; and the bent portion is provided at a height equal to or higher than an upper surface of the battery pack.

3. The vehicle battery support structure according to claim 2, wherein:

at least a part of the shock absorbing component and at least a part of the battery pack are disposed at the same height; and the shock absorbing component is supported on the side rail via the battery bracket and the suspension bracket.

4. The vehicle battery support structure according to claim 3, wherein:

the side rail is provided with a cab mount bracket that supports a cabin; and the suspension bracket is fixed to the cab mount bracket.

5. The vehicle battery support structure according to claim 4, wherein:

a rocker extending in the vehicle front-rear direction is disposed below the cabin and on an outer side of the cabin in the vehicle width direction; and the inclined portion of the suspension bracket is disposed below the rocker.

6. The vehicle battery support structure according to claim 1, wherein:

the shock absorbing component includes a flange at an inner end of the shock absorbing component in the vehicle width direction; and the flange is fixed to the vertical portion by a bolt.

7. The vehicle battery support structure according to claim 6, wherein:

the shock absorbing component includes a hook extending downward in a vehicle height direction at the inner end of the shock absorbing component in the vehicle width direction;

the battery bracket includes a hook extending upward in the vehicle height direction at an outer end of the battery bracket in the vehicle width direction; and the hook of the shock absorbing component is engaged with the hook provided on the battery bracket.

8. The vehicle battery support structure according to claim 7, wherein:

the battery bracket has a hollow structure including a plurality of inner plates;

the plurality of inner plates extend in the vehicle height direction; and the plurality of inner plates are arranged at intervals along the vehicle width direction.

9. The vehicle battery support structure according to claim 7, wherein:

the shock absorbing component has a hollow structure having a cross-shaped cross-section; and the shock absorbing component includes a plurality of inner plates inside the shock absorbing component, the plurality of inner plates including a first inner plate extending in the vehicle height direction, and a second inner plate extending in the vehicle width direction, the first inner plate and the second inner plate intersecting with each other.

10. The vehicle battery support structure according to claim 1, wherein the shock absorbing component is a step for a passenger to get on and off a cabin of a vehicle.

11. The vehicle battery support structure according to claim 1, wherein the inclined portion is sloping downward and away from a centerline of a vehicle, the centerline extending in the vehicle front-rear direction.

12. The vehicle battery support structure according to claim 1, wherein:

the side rail includes an inner side rail and an outer side rail, the inner side rail and the outer side rail each having a U-shaped cross section and being superposed to form a closed cross-sectional structure; and the suspension bracket is welded to the outer side rail.

* * * * *